US010268439B2

(12) United States Patent
Sakai et al.

(10) Patent No.: US 10,268,439 B2
(45) Date of Patent: Apr. 23, 2019

(54) PREDICTION SYSTEM, PREDICTION METHOD, AND COMPUTER PROGRAM

(71) Applicant: EIZO Corporation, Ishikawa (JP)

(72) Inventors: Yoshikazu Sakai, Ishikawa (JP); Takao Mori, Ishikawa (JP); Chiori Terashima, Ishikawa (JP)

(73) Assignee: EIZO Corporation, Ishikawa (JP)

( * ) Notice: Subject to any disclaimer, the term of this patent is extended or adjusted under 35 U.S.C. 154(b) by 7 days.

(21) Appl. No.: 15/100,180

(22) PCT Filed: Nov. 7, 2014

(86) PCT No.: PCT/JP2014/079546
§ 371 (c)(1),
(2) Date: Jun. 29, 2016

(87) PCT Pub. No.: WO2015/079888
PCT Pub. Date: Jun. 4, 2015

(65) Prior Publication Data
US 2017/0039017 A1 Feb. 9, 2017

(30) Foreign Application Priority Data

Nov. 28, 2013 (JP) ................................. 2013-246644

(51) Int. Cl.
*G06N 5/04* (2006.01)
*G09G 5/10* (2006.01)
(Continued)

(52) U.S. Cl.
CPC ............... *G06F 3/147* (2013.01); *G06N 5/04* (2013.01); *G06Q 50/10* (2013.01); *G09G 5/10* (2013.01);
(Continued)

(58) Field of Classification Search
None
See application file for complete search history.

(56) References Cited

U.S. PATENT DOCUMENTS 6,490,543 B1 * 12/2002 Jaw ..................... G05B 19/4065
340/457.4
2002/0046048 A1 * 4/2002 Fukushima ......... G05B 23/0283
709/223
(Continued)

FOREIGN PATENT DOCUMENTS

| JP | 2002-233504 A | 8/2002 |
| JP | 2003036320 A | 2/2003 |

(Continued)

OTHER PUBLICATIONS

Extended European Search Report dated Nov. 17, 2016, including the Supplementary European Search Report and the European Search Opinion, in connection with corresponding EP Application No. 14865984.0 (10 pgs.).

(Continued)

*Primary Examiner* — YuJang Tswei
(74) *Attorney, Agent, or Firm* — Maier & Maier, PLLC

(57) ABSTRACT

In a prediction system, terminal devices having monitors connected thereto and a server can communicate with each other through a network. Each terminal device acquires a luminance measured by a corresponding monitor and transmits it to the server. The server predicts the life of the monitors on the basis of information from the respective terminal devices and notifies the predicted life. The server previously stores information about the installation locations of the monitors. The server notifies the predicted life in such a manner that the installation location of each monitor and the predicted life are associated with each other. Each terminal device acquires, from a corresponding monitor, a measured luminance, a brightness setting at the time when (Continued)

| No. | INSTALLATION LOCATION | | TERMINAL DEVICE NAME | MONITOR | | | PREDICTED MONITOR LIFE | | |
|---|---|---|---|---|---|---|---|---|---|
| | SECTION | ROOM | | MODEL | SERIAL NUMBER | MODE | LIFE HOURS | PREDICTED REACHING DATE | REPLACEMENT RECOMMENDED |
| 1 | SECTION a | ROOM A | A 1 0 | MODEL 1 | 1 1 0 1 2 | D I C O M | 24325~26456 | 2021/12/28 ~ 2022/1/14 | |
| 2 | SECTION b | ROOM B | B 1 0 | MODEL 1 | 1 3 3 8 8 | D I C O M | 294~711 | 2014/5/18 ~2014/6/2 | * |
| 3 | | | B 1 1 | MODEL 1 | 1 3 3 8 9 | D I C O M | 10002~15574 | 2016/9/17 ~ 2016/10/9 | |
| 4 | SECTION c | ROOM C | C 1 0 | MODEL 2 | 2 2 2 0 9 | D I C O M | 641~1493 | 2014/8/29 ~ 2014/9/19 | * |
| ⋮ | ⋮ | ⋮ | ⋮ | ⋮ | ⋮ | ⋮ | ⋮ | ⋮ | ⋮ | the luminance has been measured, and information about the time when the luminance has been measured and transmits them to the server.

10 Claims, 9 Drawing Sheets

(51) Int. Cl.
    *G05B 23/02*     (2006.01)
    *G06F 3/147*     (2006.01)
    *G06Q 50/10*     (2012.01)
    *H04L 29/08*     (2006.01)
    *H04N 17/04*     (2006.01)
    *H04N 21/258*     (2011.01)
    *H04N 21/442*     (2011.01)
    *H04N 21/658*     (2011.01)

(52) U.S. Cl.
    CPC ....... *H04N 17/04* (2013.01); *H04N 21/25808* (2013.01); *H04N 21/4424* (2013.01); *H04N 21/6582* (2013.01); *G05B 23/0283* (2013.01); *G09G 2320/029* (2013.01); *G09G 2320/043* (2013.01); *G09G 2360/16* (2013.01); *G09G 2370/02* (2013.01); *G09G 2370/022* (2013.01); *G09G 2370/04* (2013.01); *G09G 2380/08* (2013.01); *H04L 67/10* (2013.01)

(56) References Cited

U.S. PATENT DOCUMENTS

| | | | |
|---|---|---|---|
| 2008/0062115 A1 | 3/2008 | Brown | |
| 2009/0222546 A1* | 9/2009 | Hatano | ............... H04L 41/0213 709/223 |
| 2011/0037786 A1* | 2/2011 | Hasegawa | ................ G09G 5/10 345/690 |
| 2011/0069051 A1* | 3/2011 | Nakamura | ........... G09G 3/3233 345/207 |
| 2011/0071955 A1* | 3/2011 | Nakamura | ............. G06Q 10/06 705/338 |
| 2011/0126029 A1* | 5/2011 | Jeansonne | ................ G09G 5/10 713/300 |
| 2015/0018979 A1 | 1/2015 | Tomii et al. | |

FOREIGN PATENT DOCUMENTS

| | | | |
|---|---|---|---|
| JP | 2003-067038 A | | 3/2003 |
| JP | 2003-150101 A | | 5/2003 |
| JP | 2003-217009 A | | 7/2003 |
| JP | 2006276343 A | | 10/2006 |
| JP | 2007-011246 A | | 1/2007 |
| JP | 2009-152021 A | | 7/2009 |
| JP | 2009152021 A | * | 7/2009 |
| JP | 2010-003455 A | | 1/2010 |
| JP | 2012-242598 A | | 12/2012 |
| JP | 2013-009531 A | | 1/2013 |
| JP | 2014-085774 A | | 5/2014 |
| WO | 02/093279 A2 | | 11/2002 |
| WO | 2008/155982 A1 | | 12/2008 |
| WO | 2012/157040 A1 | | 11/2012 |
| WO | 2013/125128 A1 | | 8/2013 |

OTHER PUBLICATIONS

Office Action dated May 16, 2017 of corresponding Japanese application No. 2013-246644; 6 pgs.
International Search Report dated Feb. 10, 2015 in corresponding Application No. PCT/JP2014/079546; 4 pgs.

* cited by examiner

Fig. 5

| NO. | INSTALLATION LOCATION | | TERMINAL DEVICE NAME | MONITOR | | | PREDICTED MONITOR LIFE | | |
|---|---|---|---|---|---|---|---|---|---|
| | SECTION | ROOM | | MODEL | SERIAL NUMBER | MODE | LIFE HOURS | PREDICTED REACHING DATE | REPLACEMENT RECOMMENDED |
| 1 | SECTION a | ROOM A | A10 | MODEL 1 | 11012 | DICOM | 24325~26456 | 2021/12/28 ~2022/1/14 | |
| 2 | SECTION b | ROOM B | B10 | MODEL 1 | 13388 | DICOM | 294~711 | 2014/5/18 ~2014/6/2 | * |
| 3 | | | B11 | MODEL 1 | 13389 | DICOM | 10002~15574 | 2016/9/17 ~2016/10/9 | |
| 4 | SECTION c | ROOM C | C10 | MODEL 2 | 22209 | DICOM | 641~1493 | 2014/8/29 ~2014/9/19 | * |
| | ...... | ...... | ...... | ...... | ...... | ...... | ...... | ...... | ...... |

PREDICTION SYSTEM, PREDICTION METHOD, AND COMPUTER PROGRAM

TECHNICAL FIELD

The present invention relates to a prediction system in which a server connected to, through a communication line, multiple display devices, for example, installed in the same facility in a distributed manner maintains and manages the display devices, predicts the life or the like of the display devices, and notifies the predicted life or the like, a prediction method, and a computer program.

BACKGROUND ART

For example, multiple medical display devices are installed in a facility, such as a hospital, in a distributed manner. There are individual differences in display characteristics even among display devices of the same type. There are also individual differences in the degree of degradation of display characteristics, that is, in life among display devices. For example, the individual differences in display luminance among display devices using liquid crystal panels are mostly attributable to the individual differences among backlights. There are also individual differences in life among backlights. The life of display devices depends on not only the individual differences among the display devices, but also the operating environments, the frequencies of use, or the like thereof. A display device that is frequently used in a harsh environment tends to shorten life.

Patent Literature 1 proposes a life prediction system that uses, as a criterion for determining the life of a display device, the time point when the maximum luminance falls below a predetermined critical luminance and calculates the time period over which the maximum luminance will remain within the critical luminance, on the basis of the measured luminances of the display device, Lehmann's expression, and the like.

Patent Literature 2 discloses a system in which each terminal device in a hospital collects data about various states of a corresponding medical device, determines whether an abnormality is occurring in the medical device, on the basis of the collected state data, and when it determines that an abnormality is occurring, notifies the abnormality to a computer in a service center using an email or the like. In this system, the service center, which has received the notification, can repair the medical device by remote control, forward the email to a service station in charge, and order a component from a manufacturer.

CITATION LIST

Patent Literature

Patent Literature 1: Japanese Patent No. 4372733
Patent Literature 2: Japanese Unexamined Patent Application Publication No. 2002-233504

SUMMARY OF INVENTION

Technical Problem

For example, medical display devices are required to have high quality on display characteristics thereof or the like and therefore must be maintained and managed after installed in a facility. The life of display devices can be predicted to some extent by using Patent Literature 1. However, as the size of the facility is increased, the number of display devices installed is increased as well, resulting in a problem that the human load, cost, and the like required to maintain and manage the display devices are increased.

The system of Patent Literature 2 is not intended to maintain and manage display devices. Also, with regard to the system of Patent Literature 2, which notifies an abnormality that has just occurred in a medical device, it may take time to repair or replace the abnormal device, and it may be too late to notify the abnormality, which has already occurred.

For a user who has introduced multiple devices to a facility, it is desirable to use the display devices as long as possible in terms of the cost. For this reason, there is a demand to extend the life of display devices having a short life. However, there has been no technology to extend the life of display devices.

The present invention has been made in view of the foregoing, and an object thereof is to provide a prediction system, prediction method, and computer program that can extend the life of multiple display devices introduced to a facility or the like.

Solution to Problem

The present invention provides a prediction system for predicting changes in display characteristics of display devices of a plurality of terminal devices connected to each other through a communication line. The prediction system comprises:
- information acquisition means configured to acquire information about the display characteristics of the display devices;
- prediction means configured to predict changes in the display characteristics of the display devices on the basis of the information acquired by the information acquisition means; and
- an installation location information storage that stores information about installation locations of the display devices.

The installation locations of the display devices and the changes predicted by the prediction means are associated with each other.

In the prediction system of the present invention, the installation location information storage is included in a server connected to the terminal devices through the communication line.

In the prediction system of the present invention, the terminal devices each comprise:
- the information acquisition means; and
- information transmission means configured to transmit the information acquired by the information acquisition means to the server, and the server comprises:
- information reception means configured to receive the information transmitted by the information transmission means; and
- the prediction means.

In the prediction system of the present invention, the installation location information storage and the information acquisition means are included in the terminal devices or the display devices, the terminal devices or the display devices each comprise information transmission means configured to transmit the information acquired by the information acquisition means and the installation location information stored in the installation location information storage to a server connected to the terminal devices or the display devices through the communication line, and the server comprises:
information reception means configured to receive the information transmitted by the information transmission means; and
the prediction means.

The prediction system of the present invention further comprises measurement means configured to measure the display characteristics of the display devices.

The information acquisition means acquires a result of a measurement made by the measurement means and information about the time when the measurement means has made the measurement.

In the prediction system of the present invention,
the measurement means measures luminances of the display devices which are performing a display, and
the information acquisition means acquires the luminances measured by the measurement means, information about brightness settings of the display devices at the time when the measurement means has made the measurement, and information about the time when the measurement means has made the measurement.

In the prediction system of the present invention, the prediction means predicts degradation of the luminances of the display devices.

The prediction system of the present invention further comprises notifying means configured to notify information about the installation locations of the display devices and the changes predicted by the prediction means in such a manner that the information and the predicted changes are associated with each other.

In the prediction system of the present invention, the notifying means notifies information about potential replacements for the display devices on the basis of the predicted changes.

The present invention provides a prediction method comprising:
an information acquisition step of acquiring information about display characteristics of display devices of terminal devices; and
a prediction step of predicting changes in the display characteristics of the display devices on the basis of the information acquired in the information acquisition step, wherein
information about installation locations of the display devices is previously stored, and
the installation locations of the display devices and the changes predicted in the prediction step are associated with each other.

The present invention provides a computer program for causing a computer connected to a plurality of terminal devices having display devices through a communication line to predict changes in display characteristics of the display devices, the computer program causing the computer to:
receive information about the display characteristics of the display devices transmitted from the terminal devices; predict changes in the display characteristics of the display devices on the basis of the received information; and associating installation locations of the display devices and the predicted changes with each other.

In the prediction system of the present invention, the multiple terminal devices having the display devices and the server can communicate with each other through the communication line. The terminal devices may be display devices having a communication function, computers connected to display devices, or other types of devices having display devices.

Each terminal device acquires display characteristics-related information of a corresponding display device and transmits it to the server. The server predicts changes in the display characteristics of the display devices on the basis of information from the terminal devices and notifies the predicted changes.

The present system previously stores information about the installation locations of the display devices. The information about the installation locations may be stored by the respective terminal devices or display devices, or the server, or other devices. If each terminal device or display device stores the information about the installation location, the terminal device transmits this information along with the display characteristics-related information to the server.

The server notifies the predicted changes in such a manner that the installation locations of the display devices and the predicted changes are associated with each other.

The administrator or the like, who has received the notification from the server, can identify the predicted changes in the display characteristics of the display devices and the installation locations of the display devices. Thus, the administrator or the like can determine the installation locations of display devices having a short life (e.g., display devices whose display characteristics have degraded faster) and the installation locations of display devices having along life. It can be assumed that the installation locations of the display devices having a short life are more likely to have been tough locations in terms of the operating environment, the frequency of use, or the like. For this reason, the life of the display devices can be extended by replacing the display devices having a short life with the display devices having a long life.

Further, the present system notifies the installation locations of the display devices and thus allows the administrator or the like to effectively replace display devices, for example, by replacing with display devices installed in adjacent locations.

The system of the present invention includes the means that measures the display characteristics of each display device, and a corresponding terminal device acquires the measurement result and information about the time of the measurement to the server. The measurement means may be included by each terminal device, display device, or another device.

For example, the measurement means may measure the luminances of the display devices which are performing a display. The terminal devices acquire the measured luminances, brightness settings at the time when the measurement means has made the measurement, and information about the time when the measurement means has made the measurement and transmits them to the server. Note that if the measurement means measures a maximum luminance when the brightness setting is maximized, the terminal devices need not acquire the brightness settings or transmit them to the server.

The terminal devices repeatedly acquire and transmit the luminance or the like of the display devices. The server can predict future changes in the display luminances on the basis of the received changes in the measured luminances and the like. The server predicts the degradation of the luminances of the display devices and regards the periods before the luminances will fall below a required luminance due to the degradation, as the life of the display devices.

The information that the terminal devices acquire and transmit to the server is not limited to the measured luminances, the brightness settings, and the measurement times. The terminal devices may further acquire and transmit other types of information. For example, the terminal devices may acquire information, such as information for estimating a maximum luminance from a measured luminance, information about the temperature inside or around the corresponding display device, the installation state, the component replacement time, or the time of calibration of the measurement means, and transmit the information to the server. The server can make a more accurate prediction by using these types of information.

In the present invention, the server notifies information about potential replacements for display devices on the basis of the predicted changes. For example, the server may notify display devices which are determined to have a shorter life than a threshold, as display devices to be replaced. For example, the server may notify display devices which are determined to have a long life, as replacement display devices. At this time, considering the installation locations of the display devices to be replaced, the server may search for display devices having a long life which are installed as close as possible and then notify that both display devices should be exchanged.

Advantageous Effects of Invention

According to the present invention, the server predicts changes in the display characteristics of each display device on the basis of information from a corresponding terminal device and notifies the installation locations of the display devices and the predicted changes in a manner associated with each other. Thus, it is possible to present information necessary to replace display devices to the administrator or the like and thus to extend the life of display devices.

BRIEF DESCRIPTION OF THE DRAWINGS

FIG. 5 is a schematic diagram showing an example notification of the predicted life of monitors.

DESCRIPTION OF EMBODIMENTS

Figure 1:
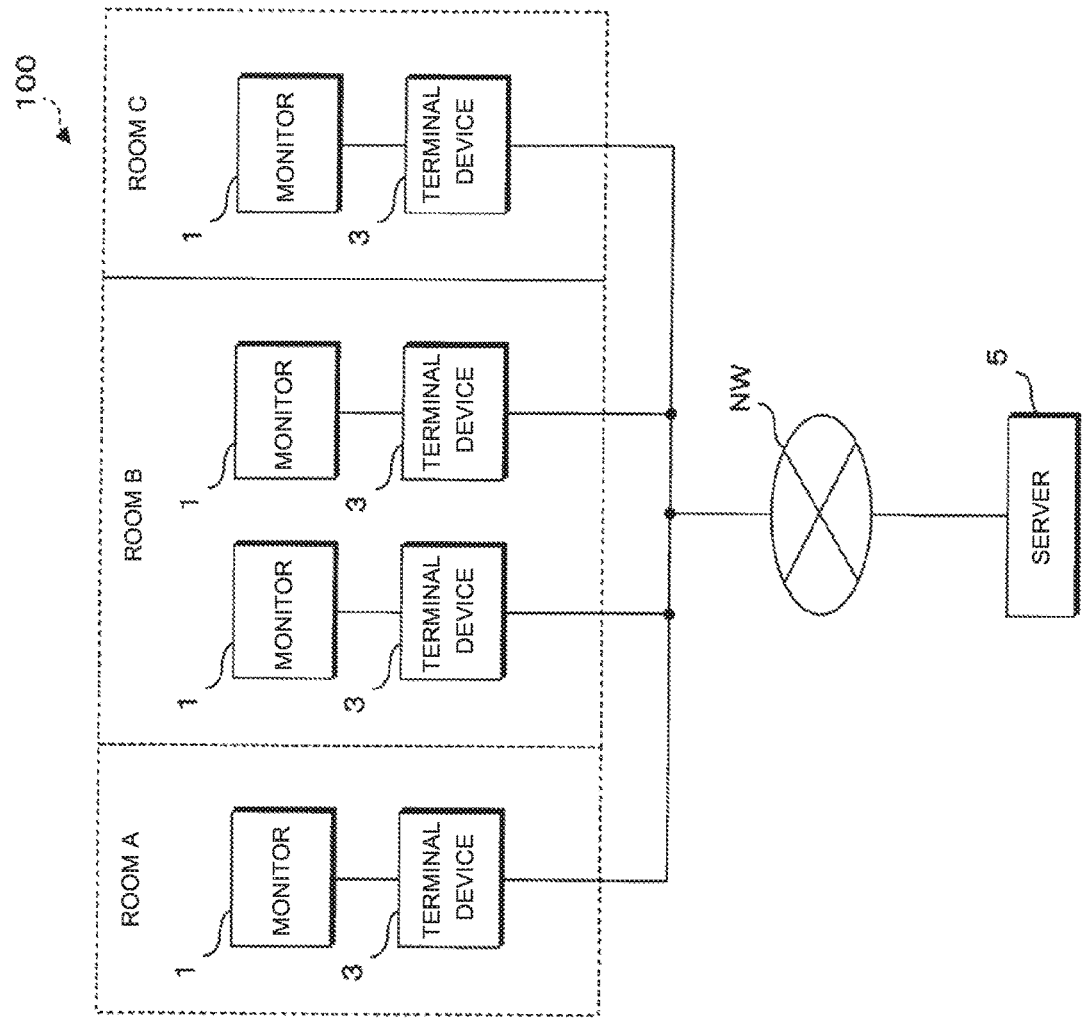
FIG. 1 is a schematic diagram showing the configuration of a monitor management system of the present embodiment.

Now, an embodiment of the present invention will be described specifically with reference to the drawings. FIG. 1 is a schematic diagram showing the configuration of a monitor management system of the present embodiment. In FIG. 1, reference sign 100 represents a facility, such as a hospital or company. The facility 100 includes multiple rooms, such as a room A, a room B, and a room C. One or more monitors 1 and one or more terminal devices 3 are installed in each of the rooms A to C. A terminal device 3 is, for example, a personal computer (PC), and has one or more monitors 1 for displaying images connected thereto. While, in the present embodiment, a single monitor 1 is connected to a single terminal device 3, multiple monitors 1 may be connected to a single terminal device 3.

The terminal devices 3 have a function of communicating with each other through a network NW. Thus, the terminal devices 3 installed in the facility 100 can transmit and receive information to and from each other. The terminal devices 3 can also communicate with a server 5 through the network NW, such as a local area network (LAN) or the Internet. The terminal devices 3 may perform communication by wire or wirelessly.

The server 5 of the present embodiment manages the monitors 1 installed in the facility 100. The server 5 may be installed inside the facility 100 or may be installed outside the facility 100. In the monitor management system of the present embodiment, each monitor 1 measures a display characteristic value thereof, for example, periodically or at any timing, and a corresponding terminal device 3 acquires the measured display characteristic value and transmits it to the server 5. The server 5 predicts the life of the monitor 1 on the basis of the display characteristic value of the monitor 1 received from the terminal device 3 and notifies the predicted life along with information about the installation location of the monitor 1.

For example, if the server 5 is installed outside the facility 100 and communicates with the terminal device 3 through the Internet, work relating to the management of the monitors 1 can be subcontracted to an outside vendor rather than being assigned to the administrator of the facility 100, or the like. Thus, the management load on the administrator can be reduced.

Figure 2:
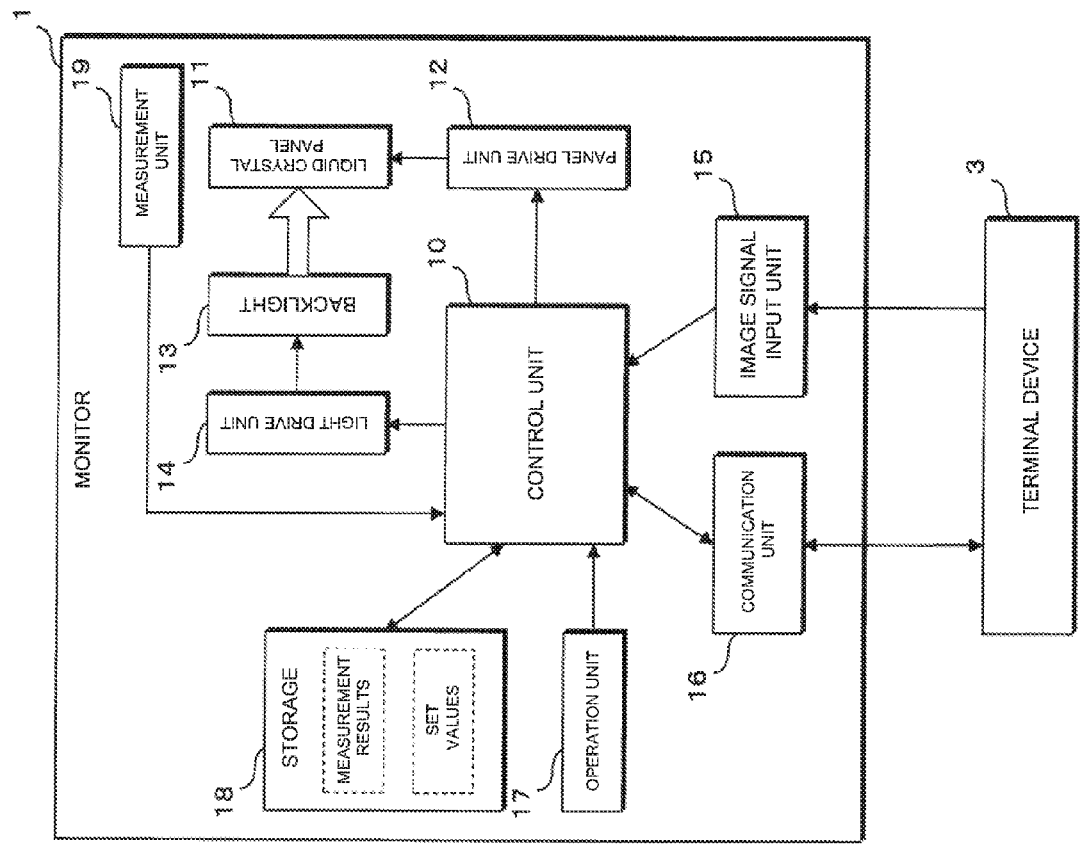
FIG. 2 is a block diagram showing the configuration of a monitor.

FIG. 2 is a block diagram showing the configuration of a monitor 1. The monitor 1 of the present embodiment is a liquid crystal monitor, which displays images using a liquid crystal panel 11. The monitor 1 includes a controller 10, a liquid crystal panel 11, a panel drive unit 12, a backlight 13, a light drive unit 14, an image signal input unit 15, a communication unit 16, an operation unit 17, a storage 18, and a measurement unit 19.

The controller 10 includes an arithmetic processor, such as a central processor (CPU). By reading and executing a control program stored in the storage 18, read-only memory (ROM; not shown), or the like, the controller 10 performs the drive control of the liquid crystal panel 11 based on a received image signal, the drive control of the backlight 13 according to the brightness setting or the like, and others. The controller 10 also performs processes, such as the measurement of the luminance of the display screen using the measurement unit 19 and the transmission of the measured luminance to the terminal device 3.

The liquid crystal panel 11 is a display device in which multiple pixels are arranged in a matrix and which displays an image by changing the transmittance of the respective pixels on the basis of drive signals from the panel drive unit 12. The panel drive unit 12 generates drive signals for driving the pixels forming the liquid crystal panel 11, on the basis of an input image provided by the controller 10 and then outputs the drive signals.

The backlight 13 includes a light source, such as a light-emitting diode (LED) or cold cathode fluorescent lamp (CCFL), and applies light to the back side of the liquid crystal panel 11. The backlight 13 emits light on the basis of a drive voltage or drive current provided by the light drive unit 14. The light drive unit 14 generates a drive voltage or drive current on the basis of a control signal from the controller 10 and outputs it to the backlight 13. The controller 10 determines the amount of drive of the backlight 13 on the basis of a brightness setting or the like received, for example, through the operation unit 17 and outputs a control signal corresponding to the determined amount of drive to the light drive unit 14. The control signal provided to the light drive unit 14 by the controller 10 is, for example, a pulse width modulation (PWM) signal.

The image signal input unit 15 has a connection terminal to which an external device, such as a terminal device 3, is connected through an image signal cable. The terminal device 3 outputs an analog or digital image signal to the monitor 1 through the image signal cable. The monitor 1 receives the image signal from the terminal device 3 through the image signal input unit 15 and provides it to the controller 10. The controller 10 performs various types of image processing to the image signal and provides the resulting signal to the panel drive unit 12. Thus, an image based on the image signal received from the terminal device is displayed on the liquid crystal panel 11.

The communication unit 16 has a connection terminal to which an external device, such as the terminal device 3, is connected through a communication cable. The communication unit 16 communicates with the terminal device 3 in accordance with a standard, such as Universal Serial Bus (USB). Thus, the monitor 1 can transmit various types of information to the terminal device 3. The terminal device 3 can perform the operation control of the monitor 1, or the like by transmitting control information or the like to the monitor 1.

The operation unit 17 includes one or more switches disposed at the front edge, side surface, or the like of the case of the monitor 1. It receives an operation of the user through these switches and notifies the received operation to the controller 10. For example, the user can change the brightness setting or color balance setting, which relates to the image display, using the operation unit 17. The controller 10 stores a setting (a set value) received by the operation unit 17 in the storage 18 and controls the operation of the elements of the monitor 1 in accordance with this set value. For example, the controller 10 determines the amount of drive of the backlight 13 in accordance with a brightness setting made by the user.

The storage 18 includes, for example, a non-volatile memory device, such as an electrically erasable programmable ROM (EEPROM) or flash memory. The controller 10 can read and write various types of information from and to the storage 18. In the present embodiment, the storage 18 stores information, including the set values received by the operation unit 17 and the results of measurements made by the measurement unit 19.

The measurement unit 19 measures the luminance of an image displayed on the liquid crystal panel 11 and provides the measured luminance to the controller 10. The measurement unit 19 includes, for example, an optical sensor and is disposed, for example, in a frame-shaped portion surrounding the liquid crystal panel 11, of the case of the monitor 1. For example, the measurement unit 19 may be configured to, in response to the controller 10 activating an actuator, motor, or the like, cause the optical sensor to exit the case, move onto the display surface of the liquid crystal panel 11, measure the luminance, and retreat from the display surface. Alternatively, the measurement unit 19 may be configured to be detachable from the monitor 1. In this case, the user measures the luminance by mounting the measurement unit 19 on the display surface of the liquid crystal panel 11 and connecting it to the monitor 1 through a signal line or the like. While, in the present embodiment, the measurement unit 19 is configured to measure the luminance as a display characteristic value of the monitor 1, it may be configured to measure other characteristic values, such as chromaticity. The controller 10 stores the luminance measured by the measurement unit 19 in the storage 18 as the measurement result.

The incorporation of the measurement unit 19 in the monitor 1 allows the luminance to be measured without the user having to do work, such as mounting of the measurement unit 19 on the liquid crystal panel 11. Thus, the luminance can be automatically measured, for example, when the user is absent. As a result, the luminance can be periodically measured without hampering the work of the user.

In the present embodiment, the controller 10 of the monitor 1 includes, for example, a timer for counting the operation hours of the monitor 1, and the measurement unit 19 measures the luminance each time the operation hours reach predetermined hours, for example, 100 hours. The controller 10 stores the luminance measured by the measurement unit 19 in the storage 18. When the controller 10 is enabled to communicate with the terminal device 3, it reads the measured luminances from the storage 18 and transmits them to the terminal device 3 through the communication unit 16. Note that the controller 10 stores, in the storage 18, the luminance measured by the measurement unit 19, as well as information about the date and time when the measurement unit 19 has made the measurement and a brightness setting at the time of the measurement. The controller 10 transmits the measured luminances and the corresponding date/time information and brightness settings to the terminal device 3. Instead of a brightness setting at the time of the luminance measurement by the measurement unit 19, the controller 10 may store and transmit the amount of drive of the backlight 13 corresponding to this brightness setting (e.g., the duty ratio of a PWM control signal provided to the light drive unit 14 by the controller 10).

Figure 3:
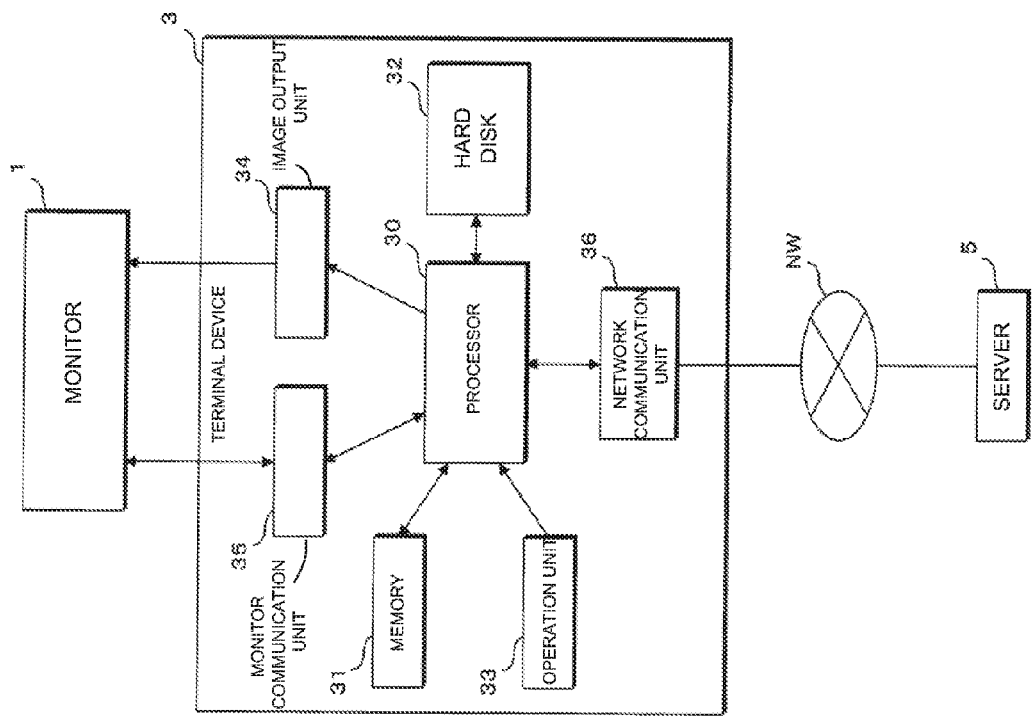
FIG. 3 is a block diagram showing the configuration of a terminal device.

FIG. 3 is a block diagram showing the configuration of a terminal device 3. The terminal device 3 includes a processor 30, a memory 31, a hard disk 32, an operation unit 33, an image output unit 34, a monitor communication unit 35, and a network communication unit 36. A general-purpose computer can be used as the terminal device 3. The processor 30 of the terminal device 3 includes an arithmetic processor, such as a CPU, and performs various types of arithmetic processing by reading and executing a program stored in the hard disk 32. In the present embodiment, the processor 30 acquires measured luminances from a corresponding monitor 1 and transmits them to the server 5.

The memory 31 includes a memory device, such as static random access memory (SRAM) or dynamic random access memory (DRAM), and temporarily stores various types of data resulting from the arithmetic processing by the processor 30. The hard disk 32 includes a magnetic disk or the like and stores various types of programs executed by the processor 30 and various types of data necessary to execute the programs. The operation unit 33 includes devices, such as a mouse and a keyboard. It receives a user operation and notifies the user operation to the processor 30.

The image output unit 34 converts a display image generated by the processor 30 into an analog or digital image signal suitable for the monitor 1 and outputs the image signal to the monitor 1. The monitor communication unit 35 communicates with the monitor 1 through, for example, a communication cable conforming to the USB standard. The network communication unit 36 communicates with the server 5 through the network NW, such as a LAN or the Internet.

In the present embodiment, for example, when the monitor 1 measures the luminance using the measurement unit 19, the processor 30 of the terminal device 3 acquires the measured luminance from the monitor 1. For example, the processor 30 may be configured to communicate with the monitor 1 at a predetermined timing, such as, at the start of the terminal device 3, and to, when the monitor 1 has measured the luminance using the measurement unit 19 and when the processor 30 has yet to acquire the measured luminance, acquire the measured luminance. Also, the following configuration may be used: the monitor 1 measures the luminance using the measurement unit 19 and then notifies to the terminal device 3 that the measurement is complete; and the processor 30 of the terminal device 3 acquires the measured luminance in response. Also, the monitor 1 may be configured to measure the luminance in accordance with an instruction from the terminal device 3 rather than spontaneously measuring the luminance. In this case, the processor 30 of the terminal device 3 may give a measurement instruction to the monitor 1 at a predetermined timing and acquire the measured luminance as a response to the instruction. The processor 30 stores the measured luminance (as well as the corresponding date/time information and brightness setting, etc.) acquired from the monitor 1 in the hard disk 32. The measured luminance and the like need not be stored in the hard disk 32 of the terminal device 3 and may be stored in, for example, an external hard disk connected to the terminal device 3 through a USB, LAN, or the like.

The processor 30 of the terminal device 3 transmits the measured luminances acquired from the monitor 1 and stored in the hard disk 32 to the server 5 through the network communication unit 36. The processor 30 may transmit the measured luminances to the server 5, for example, at a predetermined date and time, such as at 1 a.m. on the first day of each month, or in a predetermined cycle, such as every 100 days, or each time it acquires a measured luminance from the monitor 1.

Figure 4:
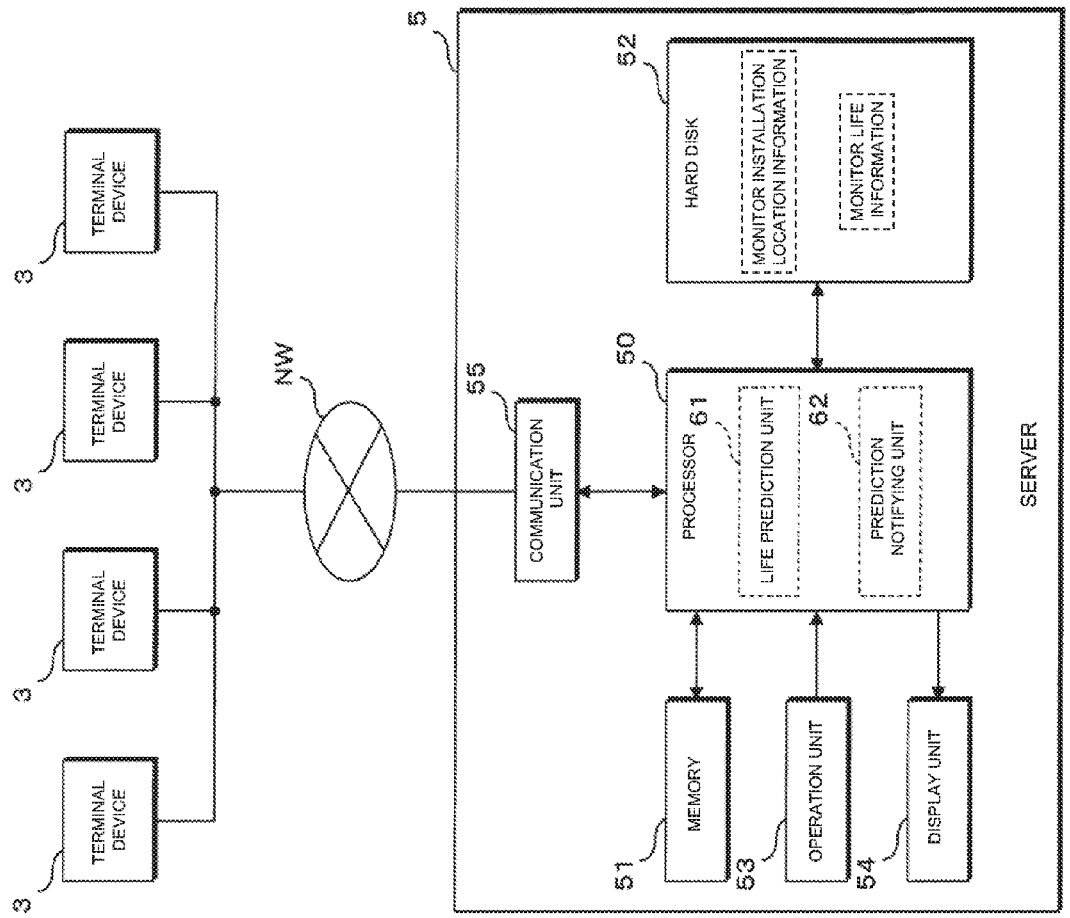
FIG. 4 is a block diagram showing the configuration of a server.

FIG. 4 is a block diagram showing the configuration of the server 5. The server 5 includes a processor 50, a memory 51, a hard disk 52, an operation unit 53, a display unit 54, and a communication unit 55. A general-purpose computer can be used as the server 5. Note that the server 5 need not be disposed separately and one of the terminal devices 3 may be commonly used as a server.

The processor 50 of the server 5 includes an arithmetic processor, such as a CPU, and performs various types of arithmetic processing by reading and executing a program stored in the hard disk 52. In the present embodiment, by executing a program, the processor 50 is provided with software function blocks, such as a life prediction unit 61 and a prediction notifying unit 62. The processor 50 performs the prediction of the life of the monitors 1, the notification of the predicted life, and the like.

The memory 51 includes a memory device, such as SRAM or DRAM, and temporarily stores various types of data resulting from the arithmetic processing by the processor 50. The hard disk 52 includes a magnetic disk or the like and stores various types of programs executed by the processor 50 and various types of data necessary to execute the programs. In the present embodiment, the hard disk 52 stores monitor installation location information including information about the installation locations of the monitors 1 in the facility 100 and monitor life information including the measured luminances received from the monitors 1 and the life predicted using the measured luminances. Note that these types of information need not be stored the hard disk 52 of the server 5 and may be stored, for example, in an external hard disk connected to the server 5 through a USB, LAN, or the like.

The operation unit 53 includes devices, such as a mouse and a keyboard. It receives a user operation and notifies the user operation to the processor 50. The display unit 54 includes a liquid crystal monitor and may be disposed separately from the server 5. The display unit 54 displays an image provided by the processor 50. The communication unit 55 communicates with the terminal devices 3 through the network NW, such as a LAN or the Internet.

In the present embodiment, the processor 50 of the server 5 receives the measured luminances from the terminal devices 3 through the communication unit 55 and stores the received measured luminances as monitor life information in the hard disk 52. At this time, the processor 50 stores each measured luminance and information, such as the identification information of the corresponding monitor 1 and information about the date and time when the luminance has been measured and a brightness setting at the time when the luminance has been measured, in such a manner that the measured luminance and the information is associated with each other. When the processor 50 predicts the life of a monitor 1, it stores the predicted life as monitor life information. The monitor life information includes the model name, serial number, operation start date/time, and the like of each monitor 1.

The monitor installation location information stored in the hard disk 52 corresponds to the facility 100. For example, when a monitor 1 is newly installed in the facility 100, corresponding information is registered in the monitor installation location information. In the monitor installation location information, information by which each monitor 1 can be identified, such as the model name and serial number, and information by which the installation location of the monitor 1 can be identified, such as the section and room, are associated with each other. For example, the monitor installation location information indicates that: a monitor 1 having identification information a101 is installed in a room A of the facility 100; monitors 1 having identification information a102 to a104 are installed in a room B; and a monitor 1 having identification information a105 is installed in a room C.

The life prediction unit 61 of the processor 50 predicts the life of the backlight 13 of each monitor 1 on the basis of information received from a corresponding terminal device 3. The life prediction unit 61 may predict the life, for example, each time it receives information from a terminal device 3, or when the user gives a life prediction instruction by operating the operation unit 53, or at other timings.

Described below is a life prediction process performed by the life prediction unit 61 of the server 5 of the present embodiment. Note that the life prediction process described below is a summary of Japanese Patent No. 4372733 owned by the present applicant. This life prediction process is only illustrative, and the life prediction unit 61 of the server 5 may perform a life prediction process in different ways. That is, the life prediction unit 61 may perform a life prediction process in any way as long as it can predict the life of each monitor 1 on the basis of information about the monitor 1 received from a corresponding terminal device 3.

Each monitor 1 measures the luminance using the measurement unit 19 thereof in a state in which the backlight 13 is being driven on the basis of a brightness setting set by the user. For this reason, the life prediction unit 61 of the server 5 calculates a maximum luminance of the monitor 1 on the basis of the measured luminance of the monitor 1 and the then brightness setting. The maximum luminance can be calculated by Formula (1) below.

[Formula 1]

$$\text{maximum luminance} = \frac{\text{measured luminance}}{a \times \text{brightness setting} + b} \qquad (1)$$

In Formula (1), factors a and b are factors for calculating a maximum luminance from a measured luminance and vary among monitors 1. For example, factors a and b are previously calculated in the production process or the like of each monitor 1 by measuring luminance change characteristics with respect to the brightness setting. The calculated factors a and b may be stored in the monitor 1 itself or may be stored in the server 5. If each monitor 1 stores the factors a and b thereof, for example, the monitor 1 stores the factors a and b in the storage 18, and the controller 10 later transmits the factors a and b along with the measured luminance to the server 5. If the server 5 stores the factors a and b of each monitor 1, for example, the server 5 stores the factors a and b of each monitor 1 in the hard disk 52 along with the monitor installation location information and monitor life information and, when predicting the life of a target monitor 1, reads the factors a and b of the monitor 1.

After calculating the maximum luminance, the life prediction unit 61 predicts the life of the monitor 1 by the Lehmann' expression [Formula (2) below]. In the Lehmann' expression below, Lm represents the maximum luminance; Lm0 represents the initial maximum luminance; t represents the operation hours of the monitor 1; and $\tau$ represents a Lehmann coefficient.

[Formula 2]

$$Lm = Lm0 \times \exp\left(-\sqrt{\frac{t}{\tau}}\right) \qquad (2)$$

The initial maximum luminance Lm0 and Lehmann coefficient $\tau$ can be calculated by substituting a maximum luminance Lm1 corresponding to the earliest measured luminance and a maximum luminance Lmn corresponding to the most recently measured luminance into the Lehmann' expression, that is, Formula (2). For this reason, the server 5 previously stores at least the earliest measured luminance and most recently measured luminance of each monitor 1 as monitor life information in the hard disk 52. The life prediction unit 61 regards the time point when the maximum luminance of a monitor 1 reaches a critical luminance Lt, as the life of the monitor 1 and calculates the maximum operation hours at which the critical luminance Lt is reached, by Formula (3) below. The critical luminance Lt may be predetermined in the design stage of the monitor 1, or the like, or may be set to an appropriate value by the administrator of the monitors 1 who uses the server 5.

[Formula 3]

$$Ts = \tau \times \left(\ln \frac{Lm0}{Lt}\right)^2 \qquad (3)$$

The life prediction unit 61 then calculates the difference between the maximum operation hours Ts calculated using Formula (3) above and the operation hours at that point in time. Thus, it calculates the hours remaining before the critical luminance Lt is reached, that is, the life of the monitor 1. The life prediction unit 61 then predicts the life of the other monitors 1 whose life is to be predicted, on the basis of the measured luminances and stores the predicted life as monitor life information in the hard disk 52.

After the life prediction process, the prediction notifying unit 62 of the server 5 notifies the life of the respective monitors 1 predicted by the life prediction unit 61. In the present embodiment, the prediction notifying unit 62 notifies by listing, on the display unit 54, the predicted life of the monitors 1 along with the installation locations of the monitors 1. Note that the prediction notifying unit 62 may notify in other ways, for example, may notify the predicted life to other devices, such as the terminal devices 3, using emails or may notify by printing the predicted life on a paper medium or the like.

FIG. 5 is a schematic diagram showing an example notification of the predicted life of the monitors 1. In the example notification shown in FIG. 5, the installation locations of the monitors 1, the names of terminal devices 3 connected to the monitors 1, information about the monitors 1, and the predicted life of the monitors 1 are listed, and these types of information are associated with each other for each monitor 1. In this example, the installation locations consist of items, such as sections and rooms. More specifically, the installation locations are combinations of sections a, b, c, and the like and rooms A, B, C, and the like. If the facility 100 is a building having multiple stories, the installation locations may include floor numbers. If the facility 100 consists of multiple buildings, the installation locations may include numbers for identifying buildings. These pieces of information are registered as monitor installation location information in the hard disk 52 of the server 5.

In this example, "terminal device name" represents a name given to a terminal device 3 to which each monitor 1 is connected. Specifically, information, such as A10, B10, B11, and C10 is displayed. Instead of terminal device name, the serial number or the like of each terminal device 3 may be displayed. Any type of information may be displayed as long as each terminal device 3 can be identified by the information. Multiple monitors 1 can be connected to a single terminal device 3. Terminal devices 3 to which the respective monitors 1 are connected can be determined as follows: each terminal device 3 incorporates source information into the header or the like when transmitting a measurement result obtained by the measurement unit 19 of a corresponding monitor 1; and the server 5 receives the measurement result and acquires the source information from the header of the received information. Alternatively, information about terminal devices 3 to which the respective monitors 1 are connected may be incorporated into the monitor installation location information in the hard disk 52 of the server 5.

In this example, information about a monitor 1 consists of items, such as the model name, serial number, and mode. The model name of a monitor 1 is, for example, information, such as model 1 or model 2. Multiple monitors 1 can be the same model name. The serial number of a monitor 1 is, for example, a five-digit number. There is no overlap between the serial numbers of multiple monitors 1. The mode of a monitor 1 refers to a display mode and is, for example, Digital Imaging and Communication in Medicine (DICOM). The server 5 can determine in which mode each monitor is making display, by causing each monitor 1 to transmit information about the display mode along with a measurement result.

In this example, the predicted monitor life of a monitor 1 consists of items, such as "life hours," "predicted reaching date," and "replacement recommended." "Life hours" represents predicted life hours calculated by Formulas (1) to (3) above. In this example, each calculated life hours include some fluctuation range. The predicted reaching date of a monitor 1 is calculated by the server 5 on the basis of the calculated life hours, the frequency of use of the monitor 1, or the like. For example, if a monitor 1 measures the luminance using the measurement unit 19 in a predetermined cycle, such as every 100 hours, the server 5 can estimate the frequency of use of the monitor 1 on the basis of the luminance measurement frequency (the luminance measurement interval). As for "replacement recommended," an asterisk symbol (*) urging replacement is given to a monitor 1 whose calculated predicted life hours fall below predetermined hours, such as 1000 hours.

In this way, the server 5 notifies the predicted life of the respective monitors 1 to the administrator of the monitors 1 who uses the server 5. Thus, the administrator can easily grasp monitors 1 whose life hours are short and whose replacement is recommended. The administrator can extract monitors 1 having long life hours on the basis of the information listed on the display and select these monitors as replacements for the monitors 1 having a short life. Further, in the present embodiment, the installation locations of the respective monitors 1 are displayed along with the predicted life. Thus, replacements for the monitors having short life hours can be selected from, for example, monitors 1 installed in the same section, monitors 1 installed in adjacent rooms, and the like.

Figure 6:
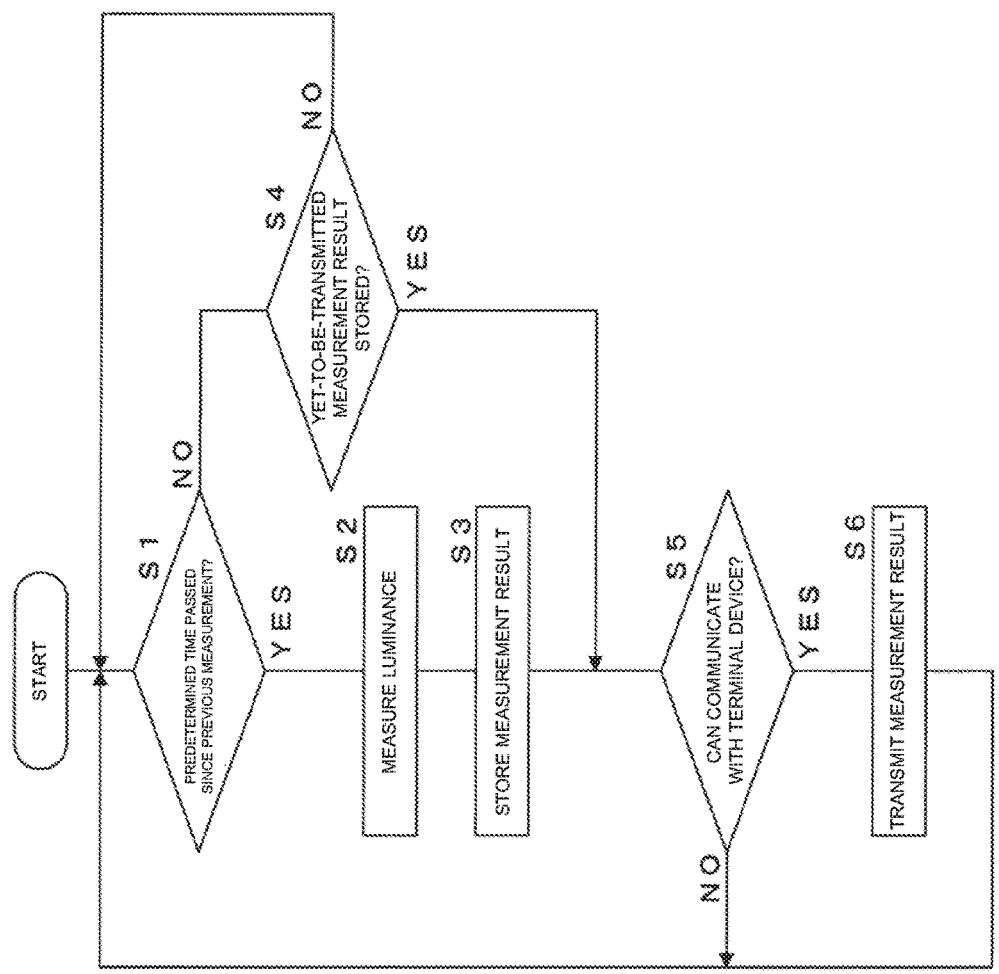
FIG. 6 is a flowchart showing the steps of a luminance measurement process performed by the monitor.

FIG. 6 is a flowchart showing the steps of a luminance measurement process performed by a monitor 1. The controller 10 of the monitor 1 measures the time that has passed since the previous luminance measurement, using a timer or the like and determines whether a predetermined time has passed since the previous luminance measurement (step S1). If the predetermined time has passed since the previous luminance measurement (S1: YES), the controller 10 activates the measurement unit 19 to measure the luminance (step S2). The controller 10 stores the luminance as a measurement result in the storage 18 (step S3) and proceeds to step S5. Note that in step S3, along with the measured luminance, the controller 10 stores information, including a brightness setting at the time when the luminance has been measured and the date and time when the luminance has been measured, in the storage 18.

If the predetermined time has not passed since the previous luminance measurement (S1: NO), the controller 10 determines whether a yet-to-be-transmitted measurement result is stored in the storage 18 (step S4). If no yet-to-be-transmitted measurement result is stored (S4: NO), the controller 10 returns to step S1. If a yet-to-be-transmitted measurement result is stored (S4: YES), the controller 10 proceeds to step S5.

The controller 10 then determines whether it can communicate with a corresponding terminal device 3 through the communication unit 16 (step S5). If it cannot communicate with the terminal device 3 (S5: NO), the controller 10 returns to step S1. If it can communicate with the terminal device 3 (S5: YES), the controller 10 transmits the measurement result stored in the storage 18 along with information, including a brightness setting and date/time corresponding to the measurement, to the terminal device 3 through the communication unit 16 (step S6) and returns to step S1.

Figure 7:
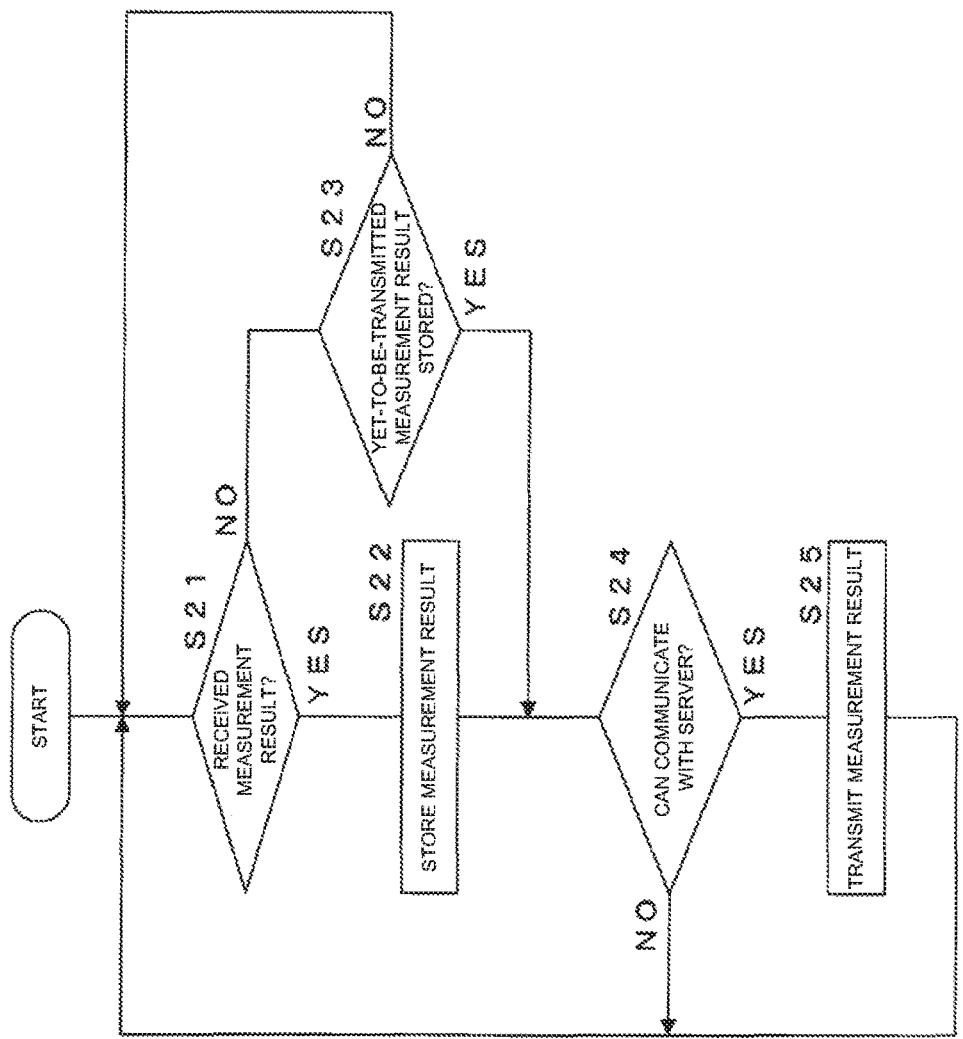
FIG. 7 is a flowchart showing the steps of a measurement result transmission process performed by the terminal device.

FIG. 7 is a flowchart showing the steps of a measurement result transmission process performed by a terminal device 3. The processor 30 of the terminal device 3 determines whether it has received a luminance measurement result from a corresponding monitor 1 through the monitor communication unit 35 (step S21). If it has received a measurement result (S21: YES), the processor 30 stores the received measurement result in the hard disk 32 (step S22) and proceeds to step S24.

If it has not received a measurement result (S21: NO), the processor 30 determines whether a measurement result which has yet to be transmitted to the server 5 is stored in the hard disk 32 (step S23). If no yet-to-be-transmitted measurement result is stored (S23: NO), the processor 30 returns to step S21. If a yet-to-be-transmitted measurement result is stored (S23: YES), the processor 30 proceeds to step S24.

The processor 30 then determines whether it can communicate with the server 5 through the network communication unit 36 (step S24). If it cannot communicate with the server 5 (S24: NO), the processor 30 returns to step S21. If it can communicate with the server 5 (S24: YES), the processor 30 reads the measurement result stored in the hard disk 32, transmits it to the server 5 through the network communication unit 36 (step S25), and returns to step S21.

Figure 8:
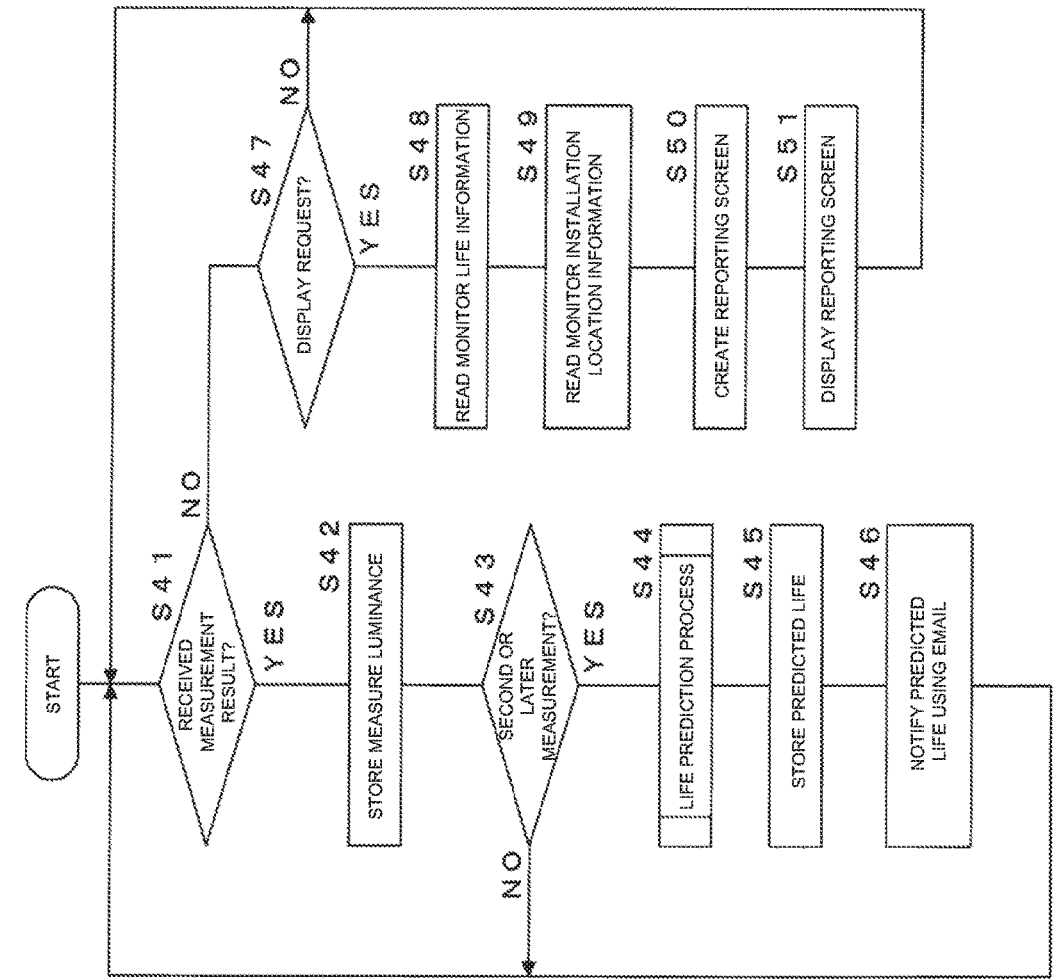
FIG. 8 is a flowchart showing the steps of a life prediction/notifying process performed by the server.

FIG. 8 is a flowchart showing the steps of a life prediction/notifying process performed by the server 5. The processor 50 of the server 5 determines whether it has received a luminance measurement result of a monitor 1 from a corresponding monitor 3 through the communication unit 55 (step S41). If it has received a measurement result (S41: YES), the processor 50 stores the received measurement result as monitor life information in the hard disk 52 in such a manner that the measurement result is associated with the identification information of the monitor 1 and the like (step S42). Thus, from which of the monitors 1 the measurement result has come can be determined.

The processor 50 then determines whether the received measurement result relates to the second or later measurement performed by this monitor 1 (step S43). If the measurement result relates to the first measurement (S43: NO), the processor 50 returns to step S41. If the measurement result relates to the second or later measurement (S43: YES), the processor 50 predicts the life of the monitor 1 using the earliest measurement result and most recent measurement result of the monitor 1 (step S44). The processor 50 then stores the predicted life as monitor life information in the hard disk 52 (step S45). The processor 50 then notifies the predicted life of the monitor 1 to the terminal device 3 which has transmitted the measurement result received in step S41, using an email or the like (step S46) and returns to step S41.

If no measurement result has been received from the terminal device 3 (S41: NO), the processor 50 determines whether the administrator has made a request to display the predicted life of the respective monitors 1 by operating the operation unit 53 (step S47). If the administrator has made no such display request (S47: NO), the processor 50 returns to step S41. If the administrator has made such display request (S47: YES), the processor 50 reads the monitor life information stored in the hard disk 52 (step S48) and also reads the monitor installation location information (step S49). The processor 50 then creates a notifying screen as shown in FIG. 5 on the basis of the read information (step S50), displays the created notifying screen on the display unit 54 (step S51), and returns to step S41.

Figure 9:
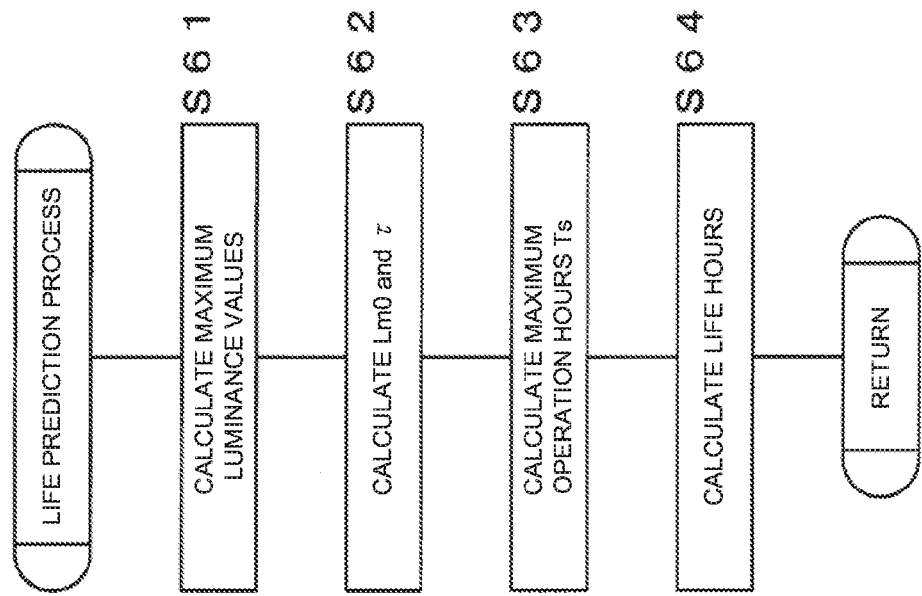
FIG. 9 is a flowchart showing the steps of a life prediction process performed by the server.

FIG. 9 is a flowchart showing the steps of a life prediction process performed by the server 5 and shows a process performed in step S44 of the flowchart shown in FIG. 8. The life prediction unit 61 of the server 5 extracts the earliest measurement result and most recent measurement result from the luminance measurement results of the monitor 1 stored as monitor life information in the hard disk 52 and calculates two maximum luminances by Formula (1) on the basis of the two measurement results (step S61). The life prediction unit 61 then calculates an initial maximum luminance Lm0 and a Lehmann coefficient τ by Formula (2) on the basis of the two maximum luminances (step S62).

The life prediction unit 61 then calculates maximum operation hours Ts by substituting the calculated initial maximum luminance Lm0 and Lehmann coefficient τ and the predetermined critical luminance Lt into Formula (3) (step S63). The life prediction unit 61 then calculates the life of the monitor 1 by calculating the difference between the calculated maximum operation hours Ts and the operation hours at that point in time (step S64), thereby ending the life prediction process.

As described above, in the monitor management system of the present embodiment, the terminal devices 3 having the monitors 1 connected thereto and the server 5 can communicate with each other through the network NW. The terminal devices 3 acquire display characteristics-related information of the monitors 1, such as the luminance, and transmit it to the server 5. The server 5 predicts changes (degradation) in the display characteristics of the monitors 1 on the basis of the information from the terminal devices 3 and notifies the predicted changes. Further, in the monitor management system of the present embodiment, installation location-related information of the respective monitors 1 is stored in the hard disk 52 of the server 5. The server 5 notifies the predicted changes with respect to the monitors 1 in such a manner that the predicted changes are associated with the installation locations of the monitors 1.

On the basis of the notification from the server 5, the administrator of the monitors 1 or the like can identify the predicted changes in the display characteristics of the monitors 1 and the installation locations of the monitors 1. Thus, the administrator or the like can determine the installation locations of monitors 1 having a short life (monitors whose display characteristics have degraded faster) and the installation locations of monitors 1 having a long life. It can be assumed that the installation locations of the monitors 1 having a short life are more likely to have been tough locations in terms of the operating environment, the frequency of use, or the like. For this reason, the life of the monitors 1 can be extended by replacing the monitors 1 having a short life with the monitors 1 having a long life. Further, since the present system notifies the installation locations of the respective monitors 1, monitors 1 can be effectively replaced, for example, by replacing with monitors 1 installed in close locations.

Each monitor 1 includes the measurement unit 19, which measures the luminance, and a corresponding terminal device 3 acquires a measurement result, that is, the luminance obtained by the measurement unit 19, a brightness setting at the time when the measurement has been made, and information about the time when the measurement has been made from the monitor 1 and transmits them to the server 5. The monitor 1 repeatedly measures the luminance using the measurement unit 19, and the terminal device 3 repeatedly acquires a measurement result from the monitor 1 and transmits the acquired measurement result to the server 5. The server 5 predicts a change in the display luminance of the monitor 1 on the basis of the measurement results received from the terminal device 3. The server 5 further predicts the degradation of the luminance of the monitor 1 and regards the period before the luminance will fall below the critical luminance due to the degradation, as the life of the monitor 1.

While, in the present embodiment, the server 5 predicts the life of a monitor 1 by Formulas (1) to (3) on the basis of the measured luminances of the monitor 1, the life of the monitor 1 may be predicted in other ways. While, in the present embodiment, the life of a monitor 1 is predicted by measuring the luminance of the monitor 1 and then predicting the life of the backlight 13, the life of the monitor 1 may be predicted by predicting the life of a component (e.g., the liquid crystal panel 11) other than the backlight 13. Accordingly, the monitor 1 need not measure the luminance and may measure other types of display characteristics.

While each monitor 1 is a liquid crystal display device having the liquid crystal panel 11, it may be other types of display device, for example, having a plasma display panel (PDP) or the like. While a monitor 1 and a corresponding terminal device 3 are separate devices, other configurations may be used. For example, a monitor and a terminal device may be integral with each other, as seen in a notebook personal computer or tablet terminal. While a terminal device 3 acquires a luminance measured by a corresponding monitor 1 and transmits it to the server 5, other configurations may be used. For example, if each monitor 1 has a function of performing communication through the network NW, the monitor 1 may transmit information, such as a measurement result, directly to the server 5 (this configuration can be regarded as a configuration in which a monitor and a terminal device are integral with each other).

While each monitor 1 includes the measurement unit 19, other configurations may be used. For example, each terminal device 3 may include a measurement unit 19, or each terminal device 3 may acquire a measurement result from a corresponding separate device including a measurement unit 19. While the measurement unit 19 measures the luminance and then the terminal device 3 transmits a brightness setting at the measurement to the server 5, the measurement unit 19 may measure by using a maximum luminance set value. In this case, there is no need to transmit the brightness setting to the server 5, nor is there a need to calculate a maximum luminance using Formula (1).

The following configuration may also be used: the luminance or maximum luminance is calculated from the amount of drive of the backlight 13; and the calculated luminance is transmitted to the server 5. For example, if the backlight 13 is feedback-controlled in accordance with the detection result of an optical sensor, temperature sensor, or the like disposed in a monitor 1, the luminance or maximum luminance can be accurately estimated from the amount of drive of the backlight 13. This eliminates the need to dispose the measurement unit 19 in the monitor 1. In this case, the server 5 may receive the amount of drive of the backlight 13 from the terminal device 3 and calculate a maximum luminance in accordance with the received amount of drive.

First Modification

While, in the above embodiment, information about the installation locations of the monitors 1 is collectively stored as monitor installation location information in the hard disk 52 of the server 5, other configurations may be used. In a monitor management system of a first modification, each monitor 1 stores information about the installation location of itself in a storage 18. For example, when installing a monitor 1 in a facility 100, the user, administrator, or the like may set information about the installation location of the monitor 1 by operating an operation unit 17. A corresponding terminal device 3 acquires, from the monitor 1, the installation location information along with information, including a luminance measured by a measurement unit 19 and a brightness setting at the time of the measurement, and transmits them to a server 5.

According to this configuration, for example, after installing or transferring a monitor 1, information about the installation location of the monitor 1 can be set in the monitor 1 on the spot. For example, this can save the operator who has installed the monitor 1 from having to return to the installation location of the server 5 and then set information about the installation location of the monitor 1.

Also, information about the installation location of a monitor 1 may be stored in a hard disk 32 by a terminal device 3 connected to the monitor 1. In this case, the terminal device 3 transmits, to the server 5, the information about the installation location of the monitor 1 along with information acquired from the monitor 1.

Second Modification

While, in the above embodiment, each terminal device 3 acquires the measured luminance of a corresponding monitor 1, a brightness setting at the measurement, and information about the time of the measurement and transmits them to the server 5, the monitor 1 and terminal device 3 may further transmit other information to the server 5. For example, the following configuration may be used: each monitor 1 or corresponding terminal device 3 stores factors a and b for calculating a maximum luminance using Formula (1) from a measured luminance; and the terminal device 3 transmits the factors a and b to the server 5.

Further, the following configuration may be used: each monitor 1 is provided with a temperature sensor and measures the temperature around the measurement unit 19, the temperature inside the monitor 1, or the like; and a corresponding terminal device 3 acquires the measured temperature and transmits it to the server 5. The server 5 can temperature-correct a luminance measured by the measurement unit 19 by acquiring such temperature information and thus can more accurately predict the life of the monitor 1.

If the user can make a selection as to whether a monitor 1 is installed in portrait orientation or in landscape orientation, a corresponding terminal device 3 may acquire information on whether the monitor 1 is installed in portrait orientation or in landscape orientation and transmit the information to the server 5. Since the influence of ambient temperature on the luminance measured by the measurement unit 19 varies in accordance with whether the monitor 1 is installed in portrait orientation or in landscape orientation, the consideration of the orientation of the installed monitor can increase the accuracy of the above temperature correction.

Each terminal device 3 may acquire information about the time of replacement of the backlight 13 of a corresponding monitor 1 and transmit the information to the server 5. The method of predicting the life of a monitor 1 on the basis of measured luminances of the monitor 1 involves predicting the life of the backlight 13. Accordingly, when the backlight 13 is replaced, the measurement results preceding the replacement become information which is not necessary when predicting the life of the monitor 1 from then on. By notifying the time of the replacement of the backlight 13 to the server 5, the life of a replacement backlight 13 can be accurately predicted. Note that if the life of a component other than the backlight 13 (e.g., the liquid crystal panel 11) is predicted, the terminal device 3 transmits the time of replacement of this component to the server 5.

Further, each terminal device 3 may acquire information about the time of calibration of the optical sensor or the like used by the measurement unit 19 for measurement and transmit the information to the server 5. The measurement result obtained by the measurement unit 19 varies due to the calibration of the optical sensor. For this reason, by grasping the time of calibration of the optical sensor, the server 5 can, for example, prevent itself from using the measurement results preceding the calibration when predicting the life from then on, or correct the measurement results to offset the influence of the calibration. Thus, the server 5 can more accurately predict the life.

Third Modification

In the above embodiment, when notifying the predicted life of the monitors 1, the server 5 gives asterisks (*) to monitors 1 having a short life whose replacement is recommended as shown in FIG. 5 and thus urges the replacement of such monitors. On the other hand, a server 5 of a third modification searches for replacement monitors 1 having a long life for monitors 1 which are predicted to have a short life, and notifies the retrieved monitors 1 as potential replacements. For example, from multiple monitors 1 whose life has been predicted, the server 5 may sequentially extract monitors 1 which are predicted to have a long life, in the descending order as potential replacements.

Further, instead of simply determining monitors 1 having a long life as potential replacements, the server 5 may determine potential replacements considering the installation locations, model names, or the like of the monitors 1. In this case, for example, the server 5 may store information about the positional relationship, distances, or the like between the rooms of the facility 100 in advance and determine, as replacements, monitors 1 having a long life installed in rooms adjacent to the rooms in which monitors 1 having a short life are installed. Further, the server 5 may notify by displaying a sketch of the facility 100 and showing the positions of the monitors 1 having a short life and the monitors 1 serving as replacements on the sketch.

Further, for example, the server 5 may store the model names (or model numbers) of the monitors 1 in advance and notifies monitors having similar specifications, such as monitors of the same model or monitors having the same screen size, as potential replacements. Thus, monitors 1 can be replaced more effectively in a facility 100, such as a hospital in which various models have been introduced according to diagnosis and treatment departments, applications, or the like.

In the above embodiment and modifications, the server 5 performs processes, such as the prediction of the life of the monitors 1, the association between the predictions and the installation location information, and the notification of the predictions. While it is useful to cause the server 5, which has high processing ability and is always operational, to perform these processes, each terminal device 3 may perform one of these processes performed by the server 5. The reason is that the server 5 and the terminal devices 3 are connected to each other through the network NW and can transmit and receive various types of information to or from each other as necessary. Or, instead of disposing the server 5 separately, each terminal device 3 may perform all the processes.

REFERENCE SIGNS LIST 1 monitor (display device)
3 terminal device
5 server
10 controller
11 liquid crystal panel
12 panel drive unit
13 backlight
14 light drive unit
15 image signal input unit
16 communication unit
17 operation unit
18 storage
19 measurement unit (measurement means)
30 processor (information acquisition means, information transmission means)
31 memory
32 hard disk
33 operation unit
34 image output unit
35 monitor communication unit
36 network communication unit
50 processor (information reception means, prediction means, notifying means)
51 memory
52 hard disk (installation location information storage)
53 operation unit
54 display unit
55 communication unit
61 life prediction unit
62 prediction notifying unit
100 facility

The invention claimed is:

1. A non-transitory computer readable medium storing a computer program for causing a computer to predict changes in display characteristics of display devices, the computer program causing the computer to function as:
an information acquisition unit configured to acquire information, transmitted from a plurality of terminal devices having display devices, about display characteristics of the display devices;
a prediction unit configured to predict changes in the display characteristics of the display devices on the basis of the acquired information;
an installation location information storage that stores installation location information for each of the display devices, wherein the installation location information specifies present installation locations in a multiple-room facility of the display devices;
a processor configured to associate installation location information and the predicted changes with each other for each of the display device, wherein the installation location information represents installation locations in a facility of the display devices; and
a notifying unit configured to notify the installation location information and the predicted changes associated with each other, and information about potential replacements for the display devices;
wherein the information about potential replacements represents a candidate for a replacement display device,
wherein, on the basis of the installation location information, the notifying unit notifies the information about potential replacements,
wherein the information about potential replacements represents the display device installed at a location closer than a predetermined distance from an installation location of the replacement recommended display device,
wherein the notifying unit notifies the information of the monitors having similar specifications of the replacement recommended display device, including monitors of the same model or monitors having the same screen size, as potential replacements.

2. The non-transitory computer readable medium of claim 1, wherein the notifying unit notifies information about potential replacements for the display devices on the basis of the predicted changes.

3. The non-transitory computer readable medium of claim 2,
wherein the information about potential replacements represents a display device which is predicted to have a longer life than a predetermined threshold as a potential replacement for the replacement recommended display device which is predicted to have a shorter life than the predetermined threshold.

4. The non-transitory computer readable medium of claim 1, further causing the computer to function as:
an installation location information storage that stores the information about installation locations of the display devices.

5. The non-transitory computer readable medium of claim 1, wherein the information acquisition unit acquires a result of a measurement of the display characteristics of the display devices and information about the time when the measurement has been made.

6. The non-transitory computer readable medium of claim 5, wherein the information acquisition unit acquires the measured luminances of the display devices, information about brightness settings of the display devices at the time when the measurement has been made, and information about the time when the measurement has been made.

7. The non-transitory computer readable medium of claim 6, wherein the prediction unit predicts degradation of the luminances of the display devices.

8. An information-processing apparatus comprising:
an information acquisition unit configured to acquire information, transmitted from a plurality of terminal devices having display devices, about display characteristics of the display devices,
a prediction unit configured to predict changes in the display characteristics of the display devices on the basis of the acquired information,
an installation location information storage that stores installation location information for each of the display devices, wherein the installation location information specifies present installation locations in a multiple-room facility of the display devices;
a processor configured to associate installation location information and the predicted changes with each other for each of the display device, wherein the installation location information represents installation locations in a facility of the display devices; and
a notifying unit configured to notify the installation location information and the predicted changes associated with each other and information about potential replacements for the display devices;

wherein the information about potential replacements represents a candidate for a replacement display device, wherein, on the basis of the installation location information, the notifying unit notifies the information about potential replacements, wherein the information about potential replacements represents the display device installed at a location closer than a predetermined distance from an installation location of the replacement recommended display device, wherein the notifying unit notifies the information of the monitors having similar specifications of the replacement recommended display device, including monitors of the same model or monitors having the same screen size, as potential replacements.

9. A prediction system for predicting changes in display characteristics of display devices of a plurality of terminal devices connected to each other through a communication line, the prediction system comprising:

an information acquisition unit configured to acquire information about the display characteristics of the display devices;

a prediction unit configured to predict changes in the display characteristics of the display devices on the basis of the information acquired by the information acquisition unit;

an installation location information storage that stores information about installation locations of the display devices, wherein the installation location information specifies present installation locations in a multiple-room facility of the display devices; and a notifying unit configured to notify information about the installation locations of the display devices and the changes predicted by the prediction unit in such a manner that the information and the predicted changes are associated with each other, wherein the notifying unit notifies information about potential replacements for the display devices on the basis of the predicted changes;

wherein the information about potential replacements represents a candidate for a replacement display device, wherein, on the basis of the installation location information, the notifying unit notifies the information about potential replacements, wherein the information about potential replacements represents the display device installed at a location closer than a predetermined distance from an installation location of the replacement recommended display device, wherein the notifying unit notifies the information of the monitors having similar specifications of the replacement recommended display device, including monitors of the same model or monitors having the same screen size, as potential replacements.

10. A prediction method for predicting changes in display characteristics of display devices of a plurality of terminal devices connected to each other through a communication line, the prediction method comprising:

an information acquisition step of acquiring information about the display characteristics of the display devices; and a prediction step of predicting changes in the display characteristics of the display devices on the basis of the information acquired by the information acquisition unit, wherein information about installation locations of the display devices is previously stored, and wherein the information about installation locations of the display devices specifies present installation locations in a multiple-room facility of the display devices;

a notifying step of notifying information about the installation locations of the display devices and the changes predicted by a prediction unit in such a manner that the information and the predicted changes are associated with each other, wherein a notifying unit notifies information about potential replacements for the display devices on the basis of the predicted changes;

wherein the information about potential replacements represents a candidate for a replacement display device, wherein, on the basis of the installation location information, the notifying unit notifies the information about potential replacements, wherein the information about potential replacements represents the display device installed at a location closer than a predetermined distance from an installation location of the replacement recommended display device, wherein the notifying unit notifies the information of the monitors having similar specifications of the replacement recommended display device, including monitors of the same model or monitors having the same screen size, as potential replacements.

* * * * *